US00RE36098E

United States Patent [19]

Vinciarelli

[11] E Patent Number: Re. 36,098

[45] Reissued Date of Patent: Feb. 16, 1999

[54] OPTIMAL RESETTING OF THE TRANSFORMER'S CORE IN SINGLE-ENDED FORWARD CONVERTERS

[75] Inventor: Patrizio Vinciarelli, Boston, Mass.

[73] Assignee: VLT Corporation, San Antonio, Tex.

[21] Appl. No.: 866,020

[22] Filed: May 30, 1997

Related U.S. Patent Documents

Reissue of:

[64] Patent No.: 4,441,146
Issued: Apr. 3, 1984
Appl. No.: 345,799
Filed: Feb. 4, 1982

U.S. Applications:

[63] Continuation of Ser. No. 538,351, Oct. 3, 1995, abandoned.

[51] Int. Cl.[6] ..... H02M 3/335

[52] U.S. Cl. ..... 363/20; 363/56

[58] Field of Search ..... 363/18–21, 56, 363/97; 323/312, 313, 318, 324

[56] References Cited

U.S. PATENT DOCUMENTS

| | | | |
|---|---|---|---|
| 1,672,215 | 6/1928 | Heising . | |
| 3,490,027 | 1/1970 | Galetto . | |
| 3,538,353 | 11/1970 | Hanger . | |
| 3,621,363 | 11/1971 | Ginnman et l. | 321/2 |
| 3,963,973 | 6/1976 | Vermolen | 321/2 |
| 4,063,306 | 12/1977 | Perkins et al. | 363/17 |
| 4,168,477 | 9/1979 | Burchall . | |
| 4,178,628 | 12/1979 | Shepard, Jr. . | |
| 4,186,434 | 1/1980 | Cowett, Jr. . | |

(List continued on next page.)

FOREIGN PATENT DOCUMENTS

| | | |
|---|---|---|
| 0350297 A2 | 1/1990 | European Pat. Off. . |
| 56-88670 | 3/1981 | Japan . |
| 56-141773 | 11/1981 | Japan . |
| 55-6887 | 5/1989 | Japan . |
| 892614 | 12/1981 | U.S.S.R. . |
| 959234 | 9/1982 | U.S.S.R. . |
| 989552 | 1/1983 | U.S.S.R. . |
| 1003067 | 3/1983 | U.S.S.R. . |
| 1107233 A | 8/1984 | U.S.S.R. . |
| 1136275 A | 1/1985 | U.S.S.R. . |
| 1224921 A | 4/1986 | U.S.S.R. . |
| 1367112 A1 | 1/1988 | U.S.S.R. . |
| 892614 | 12/1991 | U.S.S.R. . |
| 2 097 606 | 11/1982 | United Kingdom . |

OTHER PUBLICATIONS

Schematic Diagram, 3000741, VDC, 40A DC—DC Converter Module, Jun. 29, 1982.

Schematic Diagram 24VDC, 3AMP Power Supply, 3000701, Dec. 13, 1978.

Schematic Diagram, 3000741, 5VDC, 40A Power Module, Feb. 18, 1980.

Schematic Diagram, BMPS PCB ASSY, L054–920–000, Mar. 1978.

Parts List, Drawing No. 13P902–XX, Chassis Ass'y BMPS, 4 sheets, earlier than Mar. 4, 1978.

Drawing No. 054S920, Specification Switching Regulator PCB Ass'y, 12 sheets, May 1, 1978.

(List continued on next page.)

*Primary Examiner*—Adolf Berhane
*Attorney, Agent, or Firm*—Fish & Richardson P.C.

[57] ABSTRACT

The transformer's core in single ended forward converters is reset by a "magnetizing current mirror" consisting of a capacitor in series with an auxiliary switch which, during the OFF period of the primary switch, couples the capacitor to one of the transformer's windings to form a resonant circuit with the transformer's magnetizing inductance. The resonant circuit recycles the transformer's magnetizing energy by creating a mirror image of the magnetic flux between ON periods. This maximizes the flux swing available within a given core. The voltage stress on the primary switch is minimized as the voltage across the switch during the OFF period is approximately constant and automatically tailored to avoid dead time for arbitrary values of the switch duty cycle.

44 Claims, 5 Drawing Sheets

U.S. PATENT DOCUMENTS

| | | | |
|---|---|---|---|
| 4,300,191 | 11/1981 | Baranowski et al. . | |
| 4,347,474 | 8/1982 | Brooks et al. . | |
| 4,357,654 | 11/1982 | Ikenoue et al. . | |
| 4,415,959 | 11/1983 | Vinciarelli . | |
| 4,513,360 | 4/1985 | Ikenoue et al. . | |
| 4,607,323 | 8/1986 | Sokal et al. . | |
| 4,809,148 | 2/1989 | Barn | 363/20 |
| 4,857,822 | 8/1989 | Tabisz et al. . | |
| 4,928,200 | 5/1990 | Redl et al. . | |
| 4,931,716 | 6/1990 | Jovanovic et al. . | |
| 4,959,764 | 9/1990 | Bassett | 373/16 |
| 5,111,372 | 5/1992 | Kameyama . | |
| 5,126,931 | 6/1992 | Jitaru | 363/21 |
| 5,282,123 | 1/1994 | Boylan et al. | 363/21 |
| 5,291,382 | 3/1994 | Cohen | 363/16 |
| 5,303,138 | 4/1994 | Rozman | 363/21 |
| 5,331,533 | 7/1994 | Smith | 363/20 |

OTHER PUBLICATIONS

Carsten, Memordanum, "BMPS Documentation"; Cessna Invoice Job No. 17395; copy of 1640 Series Expanded data Terminal, Sep. 12, 1979.

Parts List, Drawing No. 098P902–XX, Chassis/Housing Assembly, 4 sheets, May 26, 1978.

Bill of Material, Drawing No. P054–920–000, BMPS PCB Assembly, 4 sheets, Mar. 29, 1978.

Carsten Drawing, Sep. 25, 1977 revised.

Schematic Diagram, BMP PCB Assembly, L054–920–000, Mar. 1978.

Lambda Electronics GmbH v. Vicor Corporation, English Translation of Brief filed Dec. 2, 1997 on behalf of Vicor Corporation.

Letter from Vladimir Rybakov of ARS–Patent Agency of Patent Attorneys to David L. Feigenbaum dated Oct. 10, 1997.

Bassett, John A., "New Topology Constant Frequency ZVS Converter", Power Conversion, Jun. 1990, Proceedings, pp. 249–259, Jun. 1990.

Carsten, Bruce, "Fast, Accurate Measurement of Core Loss at High Frequencies", *PCIM*, pp. 29–32, Mar. 1986.

Carsten, Bruce, A Hybrid Series–Parallel Resonant Converter for High Frequencies and Power Levels, *HFPC*, pp. 41–47, Apr. 1987.

Carsten, Bruce, "Radio Frequency Power Conversion: Fad or the Future?", *PCIM*, pp. 34–36, Jan. 1986.

Carsten, Bruce, "Switchmode Design Techniques Above 500 KHz", High Frequency Power Conversion 1986 Tutorial Session 1, Virginia Beach, Virginia, pp. 1–14, 1986.

Dixon, Lloyd H., Jr., "Switching Power Supply Topology Review", Unitrode Power Supply Design Seminar, SEM–200, pp. 1–1–1–12 and 7–3–7–11, 1983.

Hoffman, David C., et al., "Designing a VMOS 250 Watt Off–Line Inverter", Proceedings of Powercon 5, San Francisco, California, pp. G1–1–G1–5, May 4–6, 1978.

Redl, Richard, "Insulated–Gate–Transistor Drivers for Soft–Switching Converters, Synchronous Rectifiers, and ZVS/ZCS Active Snubbers", *IEEE*, pp. 493–498, 1994.

Wüstehube, "Switching Power Supplied", 1979, Expert Verlag.

Institut zur Entwicklung moderner Unterrichtsmedien e.V., "Basic Electronic Circuits", Winter 80/81, pp. 205–213.

H. Linse et al., "Elektrotechnik für Maschinenbauer", Stuttgart 1979, pp. 36–39 and 62–67.

Vinciarelli, Patrizio, Statutory Declaration in the Matter of an Application Vicor Corporation to amend U.K. Pat. No. 0100356 and in the Matter of respective oppositions thereto by Computer Products Inc. and C&D Charter Power Systems, Inc. no date.

5–A SwitchMax Power Transistors, 2N6671, 2N6672, 2N6673, File Number 1090, Harris Semiconductor Biopolar Power Devices Data Book, Mar. 1989.

Levy, Aron, "Head off dc/dc–converter problems", *Electronic Design*, vol. 17, Aug. 16, 1976, pp. 72–78.

Marsh, Alphonso, H., "Gating scheme maximuzes dc–dc converter efficiency", *Electronic Design*, vol. 20, No. 13, dated Jun. 22, 1972, p. 100.

First Translation of Appln. No. JP54–165012, disclosure No. 56–88670, 18 pp. no date.

Second Translation of Appln. No. JP54–165012, disclosure No. 56–88670, 21 pp. (copy of Japanese 56–88670 attached) no date.

Maliniak, David, "Dense dc–dc Converters Actively Share Stress", *Electronic Design*, Jan. 21, 1993, pp. 39–44.

Andreycak, Bill, "1 MHz 150W Resonant Converter Design Review", A2–1–A2–22. no date.

Bedford, B.D., et al., *Principles of Inverter Circuits*, "Transistor–Switch Inverters", 1964, pp. 48–54.

Bose, Amar, *Electro–Technology*, "A Two–State Modulation System", Aug. 1964, pp. 42–47.

Bozotti, C., et al., *Proceedings of Powercon*, "Simplifying Converter Power Stage Design with Complementary Transistor Switches", Milan Italy, pp. J5–1–J5–6. no date.

Caldwell, John W., et al., *Electronics*, "Boosting Power", Nov. 21, 1958, pp. 86–88.

Camenzind, H.R., IEEE Transactions on Audio and Electroacoustics, "Modulated Pulse Audio Power Amplifiers for Integrated Circuits", vol. AU–14, Sep. 1966, pp. 136–140.

Carsten, Bruce W., Official Proceedings of the Fourteenth International PCI '87 Conference, "High Speed Control of Sinusoidal Input Current Converters for Minimal Energy Storage Requirements", Sep. 14–17 1987, CA.

Chick, R.F., et al., Westinghouse Silicon Power Transistor Handbook, First Edition 8–9394, pp. 5–6–5–8. no date.

Femling, Don, *Instruments & Control Systems*, "Solid State Inverter", Mar. 1969, pp. 133–135.

Gottlieb, Irving M., "Regulation Power Supplies", 1971, pp. 256–258.

Jansson, L.E., *Mullard Technical Communications*, "A survey of converter circuits for switched–mode power supplies", No. 119, Jul. 1973, pp. 271–278.

Joyce, James M., et al., *PESC 77 Record*, "Power Transistor Switching with a Controlled Regenerative Current Mode Transformer", Boca Raton, Florida, Jun. 14–16, 1977, pp. 148–155.

Koney, Yu I., *Electronic Equipment in Automation*, "Design of Switching Secondary Power Sources", Collection of Articles, Founded in 1969, Issue 9, 1977, pp. 1–5.

Mammano, B, *Proceedings of Powercon 5*, "Power Switch Drivers: New IC Interface Building Blocks for Switched–Mode Converters", San Francisco, CA, May 4–6, 1978, pp. F1–1 –F1–8.

Mammano, Bob, *Proceedings of Powercon 5*, "Simplifying Converter Design with a New Integrated Regulating Pulse Width Modulator", Beverly Hills, CA, Jun. 24–26, 1976, pp. E3–1 –E3–7.

Polikarpov, A.G., et al., *Power Supplies*, "DC Voltage Pulse Stabilizer with PWM Controller of Second Kind", 1982, pp. 40–44.

Pressman, Abaham I., "Switching and Linear Power Supply, Power Converter Design", '8.7 Recurrent Circuit Problems in Converter Designs', Rochelle, NJ, pp. 259–263. no date.

Schwartz, Francisc C., *PESC '78 Record IEEE Power Electronics,* "A 95 Efficient Voltage Regulating 500 Watt Full Bridge Parallel Inverter–Converter Module with an Internal Frequency of 20 kHZ", NY, Jun. 13–15 1978, p. 331.

Spencer, John D., "Designing Switching Converters with an Improved Monolithic Control Circuit", Powercon 5 Paper, Dallas, TX, pp. I1–1 –I1–9. no date.

Spencer, John, A Texas Instruments Application Report, "Designing Switching Voltage Regulators with TL494", Dallas, TX Jul. 1978, pp. 2–10.

*Electronic Design 17,* "Head off dc/dc–converter problems", Aug. 16, 1976, pp. 72–78.

*Intersil,* "Switchmode Converter Topologies—Make Them Work for You", Cupertine, CA, 1980, pp. 1, 3, 17–18.

Expert Opinion on the European Patent 0 100 356, prepared by Dr. Richard Redl, Switzerland, with attached Appendices, pp. 1–22 no date.

The Power Transistor in Its Environment, Thomson–CSF, Semiconductor Division, "Comparison between the principal transistor converters", France, 1979, pp. 282–288.

Intersil, "The Power MOSFET, A Breakthrough in Power Device Technology", Cupertino, CA, 1980, pp. 1–14.

Polikarpov, A.G., et al., "Compensating–Parametric Pulse Type Stabilizers", *Telecommunications and Radio Engineering,* vol. 32/33, Jul. 1978, pp. 56–60.

Polikarpov, A.G., et al., Stabilized Pulse Width Modulated Regulators with an Autotransformer Type Connection of the Inductance Coils, *Telecommunications & Radio Engineering,* vol. 34/35, Nov. 1980, pp. 49–52.

Polikarpov, A.G., et al., "DC Voltage Pulse Stabilizer with PWM Controller of Second Kind", *Telecommunications & Radio Engineering,* vol. 35/36, Oct. 1981, pp. 40–44.

Polikarpov, A.G., et al., "Switched Half–Wave Voltage Converters", *Telecommunications & Radio Engineering,* vol. 49, No. 3, Mar. 1995, pp. 38–43.

Polikarpov, A.G., et al., "Dynamic Characteristics of Pulsed Voltage Converters", *Russian Electrical Engineering,* vol. 64, No. 11, 1994, pp. 53–59.

Buzykin, S.G., et al., "A Power Supply Based on a Half–Wave Voltage Converter", *Telecommunications & Radio Engineering,* vol. 40/41, Feb. 1986, pp. 8–13.

Statement of Case in the Matter of Opposition to Amendment of EP (UK) Patent No. 0100356 ("the Patent") in the name of Vicor Corporation by Computer Products, Inc. (Exhibits A–G), Jul. 25, 1996.

Schlecht, Martin F., Statutory Declaration in the Matter of EP (UK) Patent No. 0100356, Jul. 25, 1996.

Carsten, Bruce, Declaration in the Matter of Opposition to Amendment of EP (UK) Patent No. 0100356 in the name of Vicor Corporation by Computer Products, Inc. (Exhibits A–B), Feb. 5, 1997.

Leeds, Kenneth E., Declaration in the Matter of Opposition to Amendment of EP (UK) Patent No. 0 100 356 in the name of Vicor Corporation by Computer Products, Inc., Feb. 4, 1997.

Translation of Answer, District Court of Munich I, Vicor Corporation v. Lamda Electronics, GmbH u.a., Mar. 14, 1997.

Statement of Case in the Matter of an appln. to amend Patent No. EP 0200356–GB by Vicor Corporation and in the Matter of an Opposiiton thereto by C&D Charter Power Systems, Inc., Jul. 31, 1996.

Sum, K.K., et al., "Trends in High Frequency Power Conversion", 1988 (14 pp.).

Birdsall, Proceedings of Powercon 6, May 2–4, 1979, Miami Beach, Florida—Sixth National Solid–State Power Conversion Conference.

Birdsall, Proceedings of Powercon 7, Mar. 24–27, 1980, San Diego, California—Seventh National Solid–State Power Conversion Conference.

Birdsall, Proceedings of Powercon 7, Mar. 24–27, 1980, San Diego, California—Seventh National Solid–State Power Conversion Conference.

Solley Declaration, Mar. 21, 1997.

Vicor Corporation German Complaint dated Oct. 17, 1996 versus Lambda et al., exhibits K–1a–K–10a, 13 pp.

Patent registrar extract, exhibit K–1a of Vicor Corporation German Complaint (2 pp.) 1996.

Extract of the product brochure 1994/95 "Stromversorgunsgerate und Systems" (power supply devices and systems), front pages and pp. 12–14, Exhibit K–2 of Vicor Corporation German Complaint.

Extract of the product brochure 1994/95 "Stromversorgunsgerate und Systems" with information (pp. 15–22) of the delivery date of the PH series: since Sep. 1994, Exhibit K–2a of Vicor Corp. German Complaint.

"Power Module Instruction Manual", of Nemic–Lambda K.K., Exhibit K–3 of Vicor Corp. German Complaint, 1992.

"Power Module Instruction Manual", of Nemic–Lambda K.K., Exhibit K–3a of Vicor Corp. German Complaint, pp. 9, 10 1992.

Exhibits K–5 through K–6a of Vicor Corporation German Complaint 1996.

Letter dated Mar. 5, 1996 from Lloyd Wise to U.K. Patent Office re Amendment (5 pp.).

Declaration of Martin F. Schlecht dated Feb. 11, 1997 (10 pp.).

Exhibits B–F of Declaration of Martin F. Schlecht dated Feb. 11, 1997.

Jitaru, "Core Resetting Technique for Single Ended Forward Converters" (8 pp.) 1986.

"Gating scheme maximized dc–dc converter efficiency", *Electronic Design,* vol. 20, No. 13, Jul. 22, 1972, p. 100.

Schlect, Martin F., Curriculum Vitae (15 pp.), Exhibit A to Martin F. Schlecht Declaration Feb. 1997.

Exhibits B–G of Martin F. Schlect Declaration dated Jul. 25, 1996.

Vicor's Response to Lambda's Nullity Action, dated Dec. 2, 1997 (32 pp.).

Lambda's Request for Stay dated Jun. 16, 1997 (6 pp.).

Lambda vs. Vicor Nullity Action dated Jun. 9, 1997 (13 pp.).

Appendix 1A, 1B, 2, 3 of Expert Opinion of Richard Redl Jun. 1997.

Aleksandrov, F.I., et al.,"Pulse Semiconductor Converters and DC Voltage Stabilizers" (in Russian) (3 pp.) 1970.

Vicor Corporation paper filed in German District Court re Single–Ended Forward Converter dated Jan. 21, 1998 (10 pp.).

Counterstatement in the Matter of an Application by Vicor Corporation to amend European Patent (UK) 0 100356 and in the Matter of an Opposition thereto by Computer Products, Inc. (6 pp.) Oct. 21, 1996.

Counterstatement in the Matter of an Application by Vicor Corporation to amend European Patent (UK) 0 100356 and in the Matter of an Opposition thereto by C&D Chater Power Systems, Inc. (6 pp.) Nov. 8, 1996.
Sum, K.K., et al., "Trends in High Frequency Power Conversion", 1988 (14 pp.).
Carsten, "High Power SMPS Require Intrinsic Reliability", Sep. 14, 1981.
Carsten, "Design Techniques for Transformer Active Reset Circuits at High Frequencies and Power Levels", May, 1990.
Severns, Switchmode and Resonant Converter Circuits, International Rectifier Corporation, Mar. 1981.
Statutory Declaration of Bruce Carsten, dated May 14, 1998, in the Matter of Opposition to Amendment of EP (UK) Patent No. 0 100 356 in the name of Vicor Corp. by Computer Products, Inc.
Statutory Declaration of Martin F. Schlecht, dated May 15, 1998, in the Matter of an Application by Vicor Corporation to amend European Patent (UK) No. 0100356 (with Exhibit A–F).
S. Hayes, "A Design Technique for Optimizing the Power Device Utilization in Feed–Forward Converters," Proceedings of Powercon 8, 1981, pp. 1–9.
R. Severns, Switchmode and Resonant Converter Circuits, International Rectifier Corporation, publication date unknown (prior to Jun. 28, 1982).
S. Clemente, B. Pelly, and R. Ruttonsha, "A Universal 100kHz Power Supply Using a Single HEXFET," International Rectifier Corporation Applications Note AN–939, 1980, pp. 60–70.
B. Carsten, "Design Techniques for Transformer Active Reset Circuits at High Frequencies and Power Levels," HFPC Proceedings, May 1990, pp. 235–246.
B. Carsten, "High Power SMPS Require Intrinsic Reliability," PCI Proceedings, Sep. 1981, pp. 118–132.
I.M. Antonov, A.G. Polikarpov, and E.F. Serglenko, "A single Ended DC Voltage Converter," Telecommunications and Radio Engineering, 1982, No. 7, pp. 44–47.
V.I. Mileshin, "Design of Switching SEcondary Power Sources", Electronic Equipment in Automation, Edited by Yu.I. Koven, Sovestskoya Radio Press, 1977, No. 9, pp. 101–107, English translation.
Leu et al., "Comparison of The Forward Circuit Topologies With Various Reset Schemes," Proceedings of the Virginia Power Electronics Center Seminar; Blacksburg, VA, Sep. 15–17, 1991; pp. 101–109.
Integrated Circuits brochure entitled "Dual Output, Zero–Voltage Switching FET Drivers" dated Mar. 1994.
Bill Andreycak, "Active Clamp and Reset Technique Enhances Forward Converter Performance", article from Unitrode dated Oct. 1994.
Dalal and Wofford, "Novel Control IC for Single–Ended Active Clamp Converters", HFPC, May 1995 Proceedings, pp. 136–146.
Carsten, "Design Tricks, Techniques and Tribulations at High Conversion Frequencies", HFPC, Apr. 1987 Proceedings, pp. 139–152.
Jitaru, "Constant Frequency, Forward Converter With Resonant Transition", HFPC, Jun. 1991 Proceedings, pp. 282–292.
B. Carsten, High Power SMPS require intrinsic reliability PCI Proceedings, Mar. 1982 pp. 456–471.

OPTIMAL RESETTING OF THE TRANSFORMER'S CORE IN SINGLE-ENDED FORWARD CONVERTERS

Matter enclosed in heavy brackets [ ] appears in the original patent but forms no part of this reissue specification; matter printed in italics indicates the additions made by reissue.

*This application is a continuation of application Ser. No. 08/538,351, filed Oct. 3, 1995, now abandoned, which is a reissue of Ser. No. 06/345,799 filed on Feb. 4, 1982, U.S. Pat. No. 4,441,146.*

*This application, Ser. No. 08/866,020, filed May 30, 1997, and divisional application, Ser. No. 09/052,137, filed Mar. 31, 1998, are both reissues of U.S. Pat. No. 4,441,146.*

BACKGROUND OF THE INVENTION

1. Field of the Invention

This invention relates to DC-to-DC converters which process electrical power from a source, at an input DC voltage, to deliver it to a load, at an output DC voltage, by selectively connecting a power transformer to the source and the load via solid state switches. In particular, the invention relates to converters of the forward type, in which the power transformer is simultaneously connected to the source and the load. More particularly, the invention relates to forward converters of the single ended type, in which the power flow from source to load is controlled by a single solid state switch.

2. Description of the Prior Art

This invention relates to the class of DC-to-DC converters which incorporate the topology represented in FIG. 1. A converter in that class is referred to as a "single ended forward" coverter because power flow is gated by a single switch 10 and energy is transferred forward, from the primary winding to the secondary winding of the transformer 11, during the ON period of the switch 10.

Converters in this class present a unique problem, in that the conversion topology does not inherently define the mechanism by which the transformer's core is to be reset during the OFF period of the switch. The solution to this problem is not unique, as evidenced by the multiplicity of proposals found in the literature which, in order to implement the reset function, complement the topology represented in FIG. 1 by differing choices of auxiliary circuitry. The differences are important since they affect the cost of the converter, as well as its efficiency and power density.

The traditional approach, represented in FIG. 2a, has been to reset the core via an auxiliary transformer winding connected with inverted polarity in series with rectifier 13. The operation of this reset mechanism is illustrated in FIG. 2b, where, in addition to idealized component behavior, a one-to-one turn ratio between auxiliary and primary windings has been assumed. This figure exemplifies a sequence of two ON periods, separated by an OFF period to enable the core to reset itself. The figure displays, as functions of time, the state of the switch 10, the voltage V across the switch, and the current I through the auxiliary winding.

The first ON period is given by the time interval between $t_1$ and $t_2$. During this interval, the voltage V across the switch 10 vanishes and the source voltage $V_o$ is impressed upon the primary winding. The magnetizing inductance controls the slope of the magnetizing current, flowing in the primary winding, and of the magnetizing energy which accumulates in the transformer's core. The current I vanishes, as the rectifier 13 is reverse biased, in a blocking state, and thus keeps the auxiliary winding inoperative.

At time $t_2$, the opening of the switch 10 interrupts current flow in the primary winding. Neglecting the effects of leakage inductance between primary and auxiliary windings, the voltage V is clamped to 2 $V_o$ as the rectifier 13 becomes forward biased and begins to conduct the magnetizing current. The current I through the auxiliary winding is then equal to the peak value $I_p$ of the magnetizing current. Following time $t_2$, I decays as magnetizing energy is returned to the voltage source $V_o$. At time $t_3$, the recycling of the magnetizing energy is completed, the current I vanishes, and, neglecting hysteresis, the magnetic flux through the transformer's core is reset to zero. The time interval between $t_2$ and $t_3$ is the core reset period. Having assumed a one-to-one primary to auxiliary turn ratio, this period equals the ON period $t_2$–$t_1$.

The remainder of the cycle, between times $t_3$ and $t_4$, is the "dead" period. In this period, the switch 10 remains open, the voltage V across it equals the source voltage $V_o$, and the current I vanishes. The circuit in FIG. 2a is not efficiently functional during dead time.

The relative duration of the dead period depends upon the duty cycle of the switch 10 (assumed to be 33% in FIG. 2b). At 50% duty cycle, the dead period vanishes. Operation beyond 50% duty cycle would lead to saturation of the transformer's core and (catastrophic) converter failure.

Thus, the traditional reset mechanism, represented in FIG. 2a, presents an inherent limitation in the available duty cycle range. This is a significant drawback as it impairs the ability of the converter to regulate against wide variations in the source voltage or in the load. Another drawback of the traditional reset method is that allowed values of the duty cycle are in general associated with a non-vanishing dead time. The existence of a dead time causes the switch 10 to experience a peak voltage greater than is in principle necessary to reset the core in the time interval between ON periods.

Similar limitations apply, to a varying degree, to any other reset mechanism which involves a variable dead time to accomodate variations in the switch duty cycle. Reset methods falling into this category are found in S. Hayes, Proceedings of Powercon 8, Power Concepts Inc. 1981 and in R. Severns, ibid..

To avoid these limitations, a different approach to the resetting of the transformer's core in single ended forward converters was proposed by S. Clemente, B. Pelly and R. Ruttonsha in "A Universal 100 KHz Power Supply Using a Single HEXFET", International Rectifier Corporation Applications Note AN-939, December 1980. These authors suggest a capacitor-resistor-diode network, as represented in FIG. 3a. The network clamps the switch to the minimal peak voltage consistent with a given source voltage and switch duty cycle, eliminating the need for dead time while allowing for a wide range of duty cycles. Attainment of these design goals is actually dependent upon component characteristics and values. In particular, the resistor 15 must be sized small enough so that the transformer's magnetizing current does not ever vanish.

With this assumption, the operation of this reset circuit is illustrated in FIG. 3b. As in the example given to illustrate the traditional reset mechanism, a sequence of two ON periods separated by an OFF period, with a 33% duty cycle is considered. The figure displays, as functions of time, idealized waveforms defining the state of the switch 10, the voltage V across it, and the current I through the rectifier 13. During the OFF period, the latter coincides with the transformer's magnetizing current.

As exhibited in FIG. 3b, the voltage V across the switch 10 is now a rectangular waveform with a peak value equal to 1.5 $V_o$. The current I through the rectifier 13 is a trapezoidal waveform which, during the OFF period, decays from a peak value ($I_p$+$I_o$) to a minimum value $I_o$, a non-negative function of $V_o$ and the duty cycle D.

A comparison of the voltage waveform of FIG. 3b with the corresponding one in FIG. 2b emphasizes the main advantage of the capacitor-resistor-diode clamp: a reduction in the voltage stress applied to the switch 10. A related advantage is the elimination of bounds resulting from core saturation on the duty cycle range, enabling the converter to remain functional over wider ranges of input voltage and output load. A further advantage is the avoidance of auxiliary transformer windings which simplifies transformer construction. Unfortunately, while attaining these benefits, the reset mechanism of FIG. 3a compromises the converter's efficiency and power density.

The reduction in the efficiency of the conversion process arises principally from the dissipation of magnetizing energy accumulated in the transformer during the ON period. Instead of being recycled, this energy is converted into heat by the clamp circuit. This power waste is significant, particularly in an otherwise efficiency mindful conversion system.

The reduction in power density results mainly from an increase in the size of the transformer which is rendered necessary by a decrease in the available dynamic flux swing for the magnetic material making up the transformer's core. This is evidenced in FIG. 3b by the quantity referred to as $I_o$, which represents a non-negative, static component of the magnetization current. The component shifts the peak value of the magnetizing current, leading to an excitation of the transformer's core which brings the magnetic material closer to saturation. The consequent decrease in available flux swing reduces the power handling capability per unit volume at a given frequency of a given core and, with it, the converter's power density.

From these points of view, the traditional reset mechanism of FIG. 2a offers important, relative advantages. However, even from the point of view of core utilization, it does not represent an optimal reset mechanism, since the flux swing is still unipolar. This unipolar character of the transformer's core excitation has often been noted to be an inherent drawback of single ended forward converters. In fact, it is not a general drawback of this class of conversion topologies as it is only inherent to some reset mechanisms which have been adopted to complement those topologies.

These considerations suggest that the "optimal" reset mechanism for single ended forward converters, yet to be invented, should incorporate the following set of objectives:

it should be non-dissipative in nature, i.e. it should recycle the core's magnetization energy;

it should maximize the available flux swing, i.e. it should lead to a bipolar core excitation;

it should minimize the voltage stress on the switch, i.e. the voltage waveform should be rectangular without involving a dead period;

it should not introduce constraints on the switch duty cycle;

it should simplify transformer construction by eliminating the need for auxiliary windings.

SUMMARY OF THE INVENTION

This invention provides new apparatus for resetting the transformer's core in single ended forward converters. The apparatus consists of a storage capacitor, an auxiliary solid state switch (distinguished from the primary switch which controls the converter's power flow), and of a switch control circuit. The switch control circuit operates the auxiliary switch in its open state during the converter's ON period, when the primary switch is closed, and in its closed state during the converter's OFF period when the primary switch is open. The auxiliary switch (operated by such a control circuit) and storage capacitor are connected in parallel with a transformer winding.

The apparatus defined above resets the transformer's core by implementing the conceptual function of a "magnetizing current mirror": it takes the magnetization at the end of the ON period and creates a mirror image of it prior to the initiation of the following conversion cycle. The image is created via the charging and discharging of the storage capacitor which forms a resonant circuit with the transformer's magnetizing inductance. The capacitor is sized so that the period of this resonant circuit is considerably greater than the conversion period. Consequently, the capacitor's voltage and the voltage across the primary switch are approximately constant during the OFF period.

The new apparatus provides optimal resetting of the transformer's core in single ended forward converter topologies:

it is non-dissipative, as it recycles the core's magnetization energy via intermediate storage in a resonant circuit;

it maximizes the available flux swing, as it creates a mirror image of the magnetic flux between ON periods;

it minimizes the voltage stress on the (primary) switch, as it applies to this switch during the OFF period an approximately constant voltage which is automatically tailored to avoid dead time;

it does not introduce constraints on the switch duty cycle due to core saturation;

it simplifies transformer construction, as it can be implemented without auxiliary windings.

DETAILED DESCRIPTION OF THE INVENTION

Figure 4A:
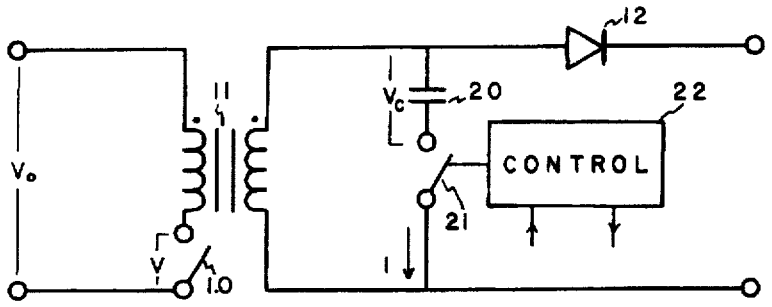
FIG. 4a discloses a preferred embodiment of the new reset mechanism for single ended forward converters, consisting of a "magnetizing current mirror" connected across the transformer's secondary.

Referring now to FIG. 4a, the primary switch 10 selectively couples the primary winding of transformer 11 to a source of voltage $V_o$. A rectifier 12 is connected in series with the secondary winding of transformer 11 and is oriented to conduct a current during the ON period of the primary switch 10. These are conventional elements of a single ended forward converter. In order to reset the transformer 11 during the OFF period of the primary switch 10, these elements are complemented by a "magnetizing current mirror."

The magnetizing current mirror comprises the storage capacitor 20, the auxiliary switch 21 and the switch control circuit 22. The capacitor 20 and the switch 21 are connected in series. The switch 21 is operated by the control circuit 22 in accordance with a control logic requiring that the auxiliary switch 21 be opened prior to the ON period of the primary switch 10, and closed after this period. To accomplish this function, as suggested by the arrows at the bottom of the box representing the switch control circuit 22, this circuit is interfaced with primary switch control circuitry, not represented in the figure. The implementation of the control circuit and of its interface can be realized in a number of ways which will become obvious to those skilled in the art.

In FIG. 4a, the magnetizing current mirror is connected in parallel with the secondary winding of transformer 11. Assuming an equal number of turns between this and the primary winding, and neglecting the effects of leakage inductance between primary and secondary windings, and parasitic effects including the ones associated with winding capacitance or the capacitance of non-ideal hardware realizations of the primary switch 10 and auxiliary switch 21, the operation of the magnetizing current mirror as a reset mechanism is illustrated by an example in FIG. 4b.

Figure 1:
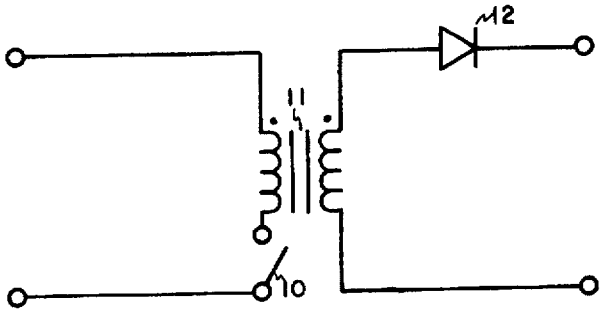
FIG. 1 defines the general class of single ended forward converters.
Figure 2A:
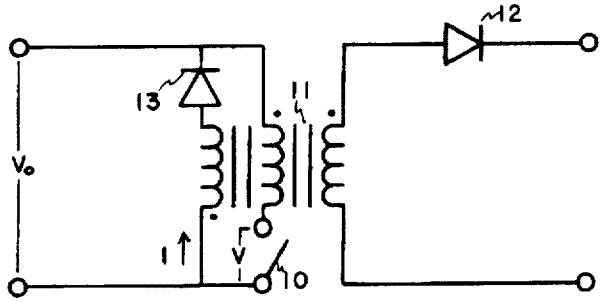
FIG. 2a shows the auxiliary transformer winding which has been traditionally employed to reset the core in single ended forward converters.
Figure 2B:
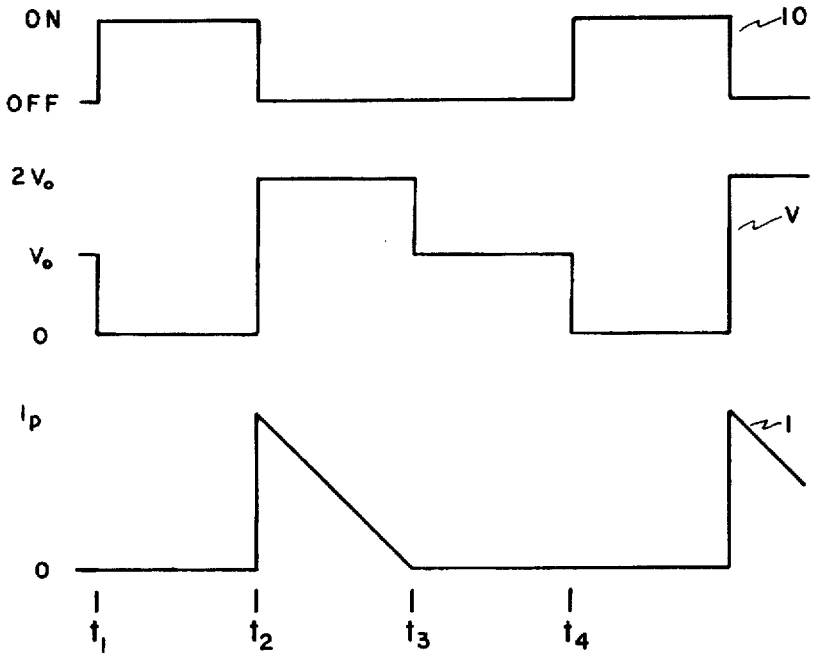
FIG. 2b exemplifies the operation of the reset mechanism in FIG. 2a by displaying a possible time sequence of states for the switch 10 and the corresponding idealized waveforms for the voltage V, across the switch 10, and the current I, in the auxiliary transformer winding.
Figure 4B:
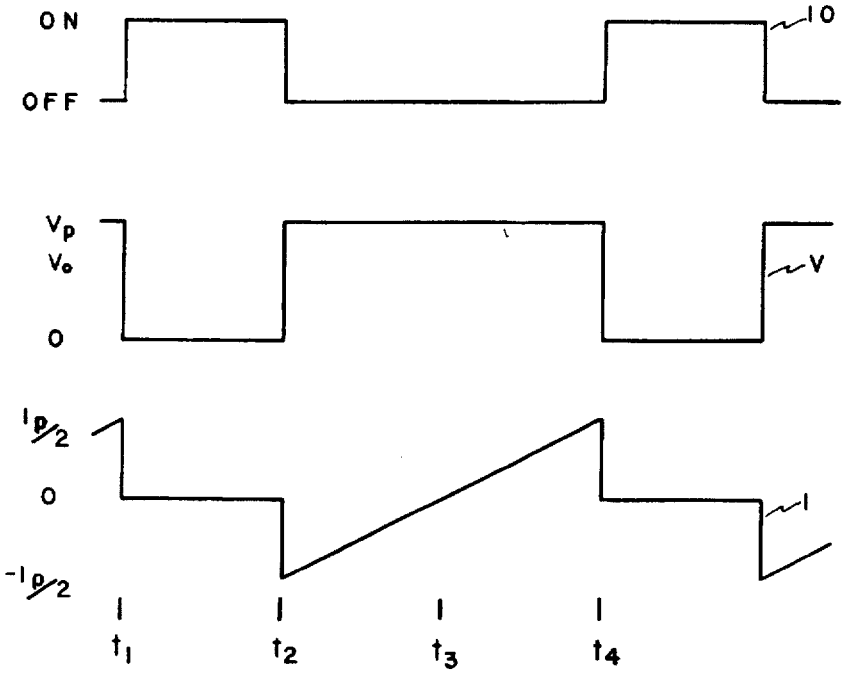
FIG. 4b discloses voltage and current waveforms useful in describing the operation of the new reset mechanism.

As in the examples of FIG. 1b and 2b which were used to characterize the operation of reset mechanisms found in the prior art, FIG. 4b considers a sequence of two ON periods separated by an OFF period, with a 33% duty cycle. The figure displays, as functions of time, idealized waveforms defining the state of the switch 10, the voltage V across it and the current I through the auxiliary switch 21.

At time $t_1$, the auxiliary switch 21 is opened and the primary switch 10 is closed, initiating the first ON period. During this period, the voltage V across the primary switch and the current I through the auxiliary switch vanish. The source voltage $V_o$ is impressed upon the primary winding of transformer 11, causing the magnetic flux $\phi$ across the transformer's core to change with time as dictated by Faraday's law. If N is the number of primary (and secondary) turns, the total change in the flux $\phi$ is $V_o(t_2-t_1)/N$. Concurrent with this is a change in the magnetizing current given, in terms of the magnetizing inductance $L_M$, by $V_o(t_2-t_1)/L_M$.

At time $t_2$, the primary switch 10 is opened and the auxiliary switch 21 is closed, initiating the OFF period. During this period, the voltage across the auxiliary switch and the current through the primary switch vanish. The voltage V across the primary switch is clamped to a value $V_p=V_o+V_c$, where $V_c$ is the voltage across the storage capacitor 20. Conduction of the magnetizing current is transferred to the secondary winding where the current loop is closed by the storage capacitor 20 and the auxiliary switch 21. Initially, this current, I, is negative in sign and equal in magnitude to $I_p/2$.

The evolution of the system during the OFF period, the time interval between $t_2$ and $t_4$, depends upon the capacitance value C chosen for the storage capacitor 20. C should be chosen to be large enough so that the time dependence of the voltage, $V_c$, across the capacitor can be approximately neglected. This accounts for the constancy of the voltage V, and the linear rise of the current I, both displayed in FIG. 4b. Invoking once again Faraday's law, the total change in the magnetic flux $\phi$ during the OFF period is then approximately given by $-V_c(t_4-t_2)/N$. By equaling the magnitude of this change to the corresponding flux change during the ON period, it follows that $$V_p \cong V_o(1+D) \tag{1}$$

where $D=(t_2-t_1)/(t_4-t_2)$ is the primary switch duty cycle. The total change in the magnetizing current I during the OFF period is approximately given by $-V_c(t_4-t_2)/L_M$. Since the integral of the magnetizing current I during the OFF period must vanish (under steady state conditions), it follows that $$I_p/2 \cong V_o t_{ON}/(2L_M), \tag{2}$$

where $t_{ON}=(t_2-t_1)$ is the ON time of the primary switch.

The evolution of the system during the OFF period may be analyzed further by dividing the period into two intervals, $t_2-t_3$ and $t_3-t_4$, of equal duration, characterized respectively by negative and positive values of the magnetizing current I. In the first interval, the magnetizing current charges the storage capacitor 20, and storage of magnetizing energy is progressively transferred from the transformer to the capacitor. This process is completed at time $t_3$ when the magnetizing current vanishes. In the second interval, the magnetizing current discharges the storage capacitor 20, and storage of magnetizing energy is progressively transferred back from the capacitor to the transformer. This process is completed at time $t_4$ when a mirror image of the magnetizing current has been formed and magnetizing energy has been reflected into the transformer, resetting it for the next cycle.

Because of the alternating character of the magnetizing current I, the auxiliary switch 20 must be able to conduct negative as well as positive currents, in addition to being able to block positive voltages. This observation suggests MOSFET transistors as natural candidates to implement the functions of the switch 21.

Figure 4C:
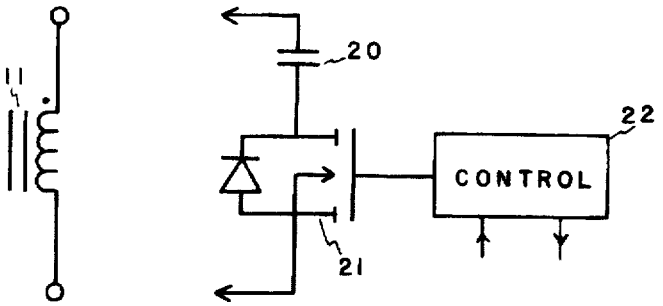
FIG. 4c discloses a preferred implementation of the magnetizing current mirror in which the auxiliary switch is realized in terms of a MOSFET transistor and its integral reverse rectifier.

FIG. 4c shows a magnetizing current mirror in which the auxiliary switch 21 is implemented with a MOSFET transistor. The reverse rectifier inherent to the MOSFET is explicitly shown. Thus the auxiliary switch 21 can be thought of as being always closed to negative currents and selectively closed to positive currents. The flow of positive currents is controlled by the switch control circuit 22 which applies a suitable voltage to the gate of the MOSFET.

Referring back to the example of FIG. 4b, it is apparent that the MOSFET 21 can be turned on at any time between $t_2$ and $t_3$ without disrupting the operaion of the magnetizing current mirror. Such a delay does not represent "dead" time since during this time the reset mechanism is operational. On the other hand, a delay between the opening of the auxiliary switch 21 and the closing of the primary switch 10 represents dead time. For this reason it is efficient to keep such a delay to a minimum, consistent with the requirement to avoid an overlap between switches. However, a small delay is useful to allow the magnetizing current to charge and discharge parasitic capacitances associated with the switches and windings.

Figure 4D:
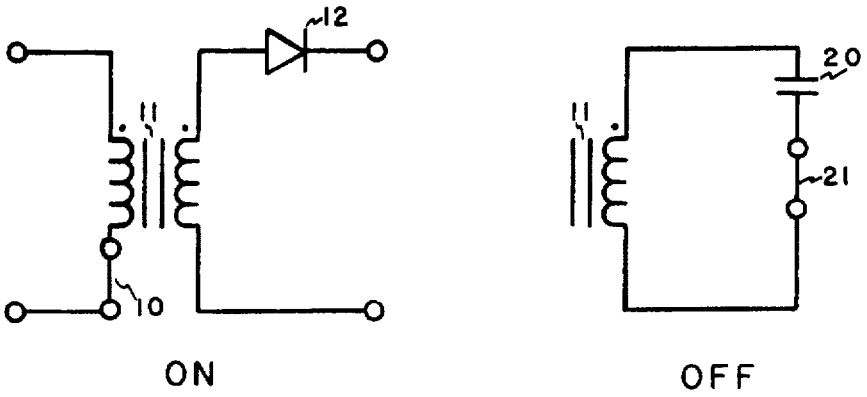
FIG. 4d discloses equivalent circuit diagrams characterizing the ON and OFF periods of a single ended forward converter reset by a magnetizing current mirror.

A different perspective on the operation of the magnetizing current mirror as a reset mechanism for single ended forward converters is offered by FIG. 4d showing equivalent circuit diagrams characterizing the converter's ON and OFF periods. The magnetizing current mirror is operational only during the OFF period, when the storage capacitor 20 is connected via the auxiliary switch 21, in its closed position, across a winding of transformer 11. These elements form a resonant circuit of period $T_{res}=2\pi\cdot\sqrt{L_M C}$, where $L_M$ is the transformer's magnetizing inductance as seen from the mirror and C is the mirror's capacitance. During the OFF period of the converter's cycle, the resonant circuit undergoes a portion of its natural cycle which, under steady state conditions, is centered about a voltage maximum. Approximate constancy of the voltage seen by the primary switch 10 during the OFF period translates into the requirement that the OFF period $t_{OFF}$ be small relative to the resonant period $T_{res}$, $t_{OFF}<<T_{res}$.

The condition $t_{OFF}<<T_{res}$ should, however, not be interpreted to mean that the mirror's capacitance should be made arbitrarily large, since the resonant period $T_{res}$ introduces a time scale which limits the converter's transient response time. As implied by Eq. (1), a change in the converter's duty cycle leads to a change in the voltage across the storage capacitor 20. To effect the latter, the integral of the magnetizing current during the OFF period is non-vanishing. Consequently, under transient conditions Eq.(2) ceases to be applicable. To avoid transformer saturation the peak value of the magnetizing current must then be limited by limiting the rate of change of the converter's duty cycle and, therefore, the transient response time.

Aside from transient conditions, during which the voltage $V_c$ across the storage capacitor 20 changes to adjust itself to a varying duty cycle, the magnetizing current mirror and the transformer's core define an essentially closed system: magnetizing energy transferred from the transformer to the storage capacitor is injected back into the transformer within the converter's OFF period. This internal recycling is only incomplete to the extent that non-ideal circuit elements give rise to energy losses. These may be accounted for by modifying the resonant circuit of FIG. 4d with the addition of resistive components representing the effects of losses associated with the transformer's core, the winding resistance and the equivalent series resistances of the storage capacitor 20 and the auxiliary switch 21.

The equivalent circuits of FIG. 4d suggest that applications of the magnetizing current mirror to the resetting of the transformer's core in single ended forward converters need not be restricted to the topology of FIG. 4a. Useful variations of the new reset mechanism are indeed obtained by connecting the mirror in parallel with different transformer windings.

Figure 4E:
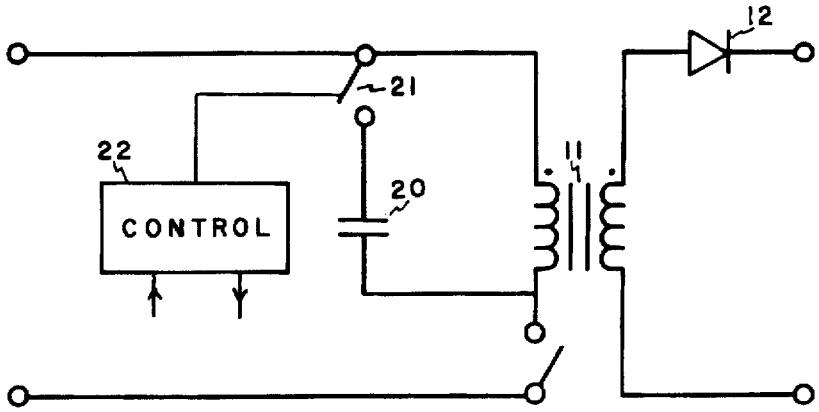
FIG. 4e discloses an embodiment of the new reset mechanism in which the magnetizing current mirror is connected across the transformer's primary.

In FIG. 4e, the magnetizing current mirror is connected in parallel with the primary winding of transformer 11. The main advantage of this topology, relative to that of FIG. 4a, originates from a direct coupling of the mirror to the primary switch 10. This eliminates a certain amount of ringing of the voltage V across the primary switch, due to leakage inductance and parasitic capacitances, which is present with the topology of FIG. 4a. However, this is not a serious problem. On the other hand, a MOSFET implementation of the switch 21 in FIG. 4e would require the use of a p-channel device and/or a floating gate drive. This is a relatively serious drawback for this topology.

Figure 4F:
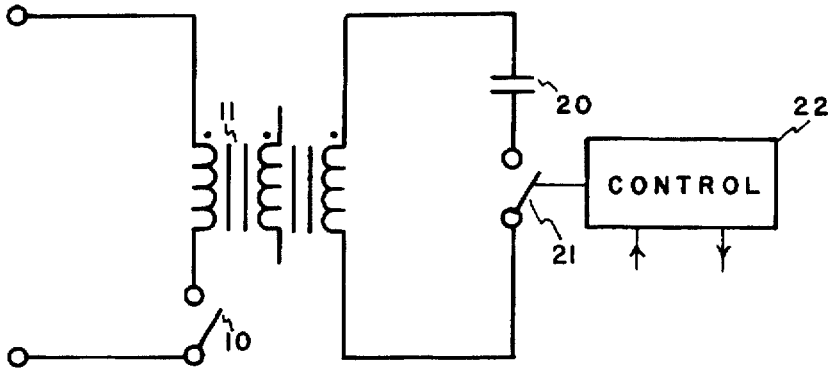
FIG. 4f discloses yet another embodiment of the invention in which the magnetizing current mirror is connected across an auxiliary transformer winding.

In FIG. 4f, the magnetizing current mirror is connected in parallel with an auxiliary transformer winding. Possible advantages to this configuration originate from the flexibility provided by the choice of turn ratio between auxiliary and primary windings, and the possibility to magnetically couple these windings closely. The trade off is added complexity in transformer construction.

Figure 3A:
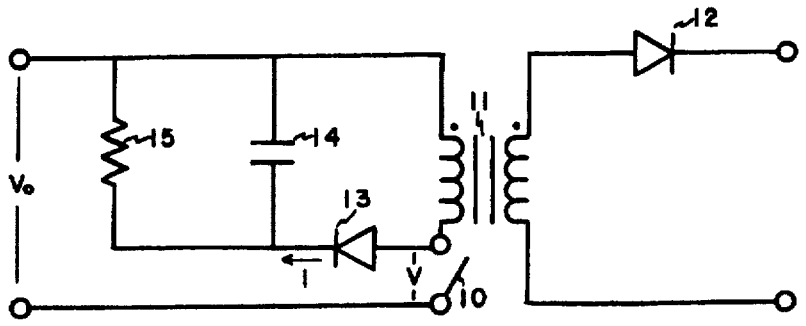
FIG. 3a shows a capacitor-resistor-diode network which has been employed in the prior art as an alternative mechanism for resetting the core in single ended forward converters.
Figure 3B:
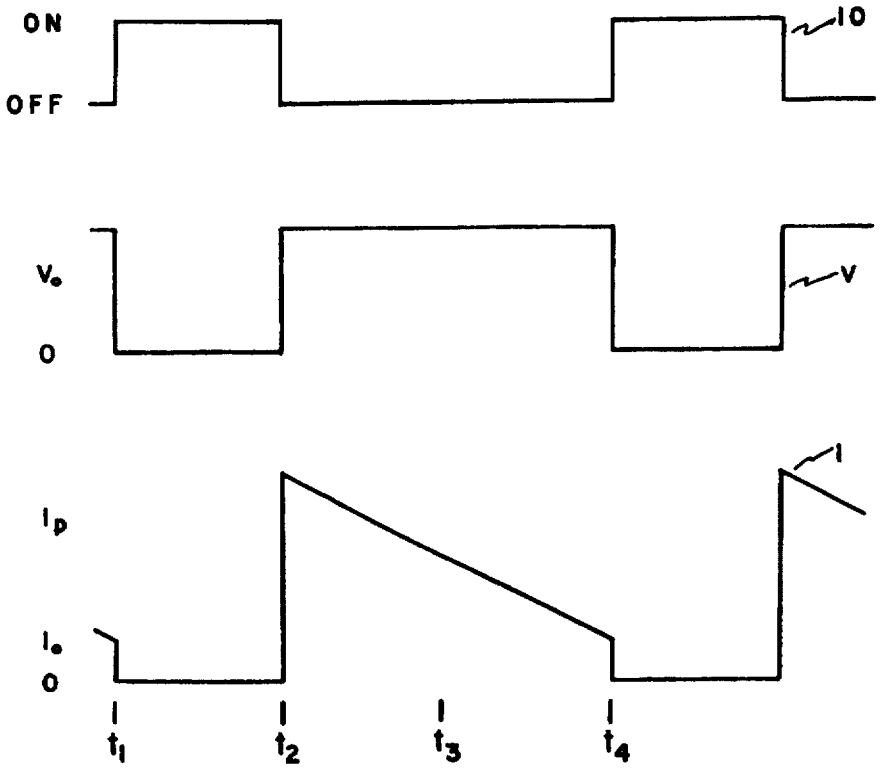
FIG. 3b provides an example of the operation of the reset mechanism in FIG. 3a analagous to that of FIG. 2b to allow for a direct comparison of voltage and current waveforms.

These and other possible variations in the detailed implementation of the new reset mechanism share the same equivalent circuits of FIG. 4d and the same fundamental advantages when compared to reset mechanisms known in the prior art. Some of these advantages are made more evident by referring to FIG. 5, which compares the idealized behavior of the magnetic flux as it would evolve in the examples of FIGS. 2b, 3b and 4b, corresponding to: (a) the traditional reset mechanism; (b) the capacitor-resistor-diode network; (c) the new reset mechanism. The curves denoted respectively by a, b and c define as a function of time the flux across a core made of soft ferromagnetic material of negligible hysteresis. The saturation flux is denoted by $\phi_{sat}$.

Figure 5:
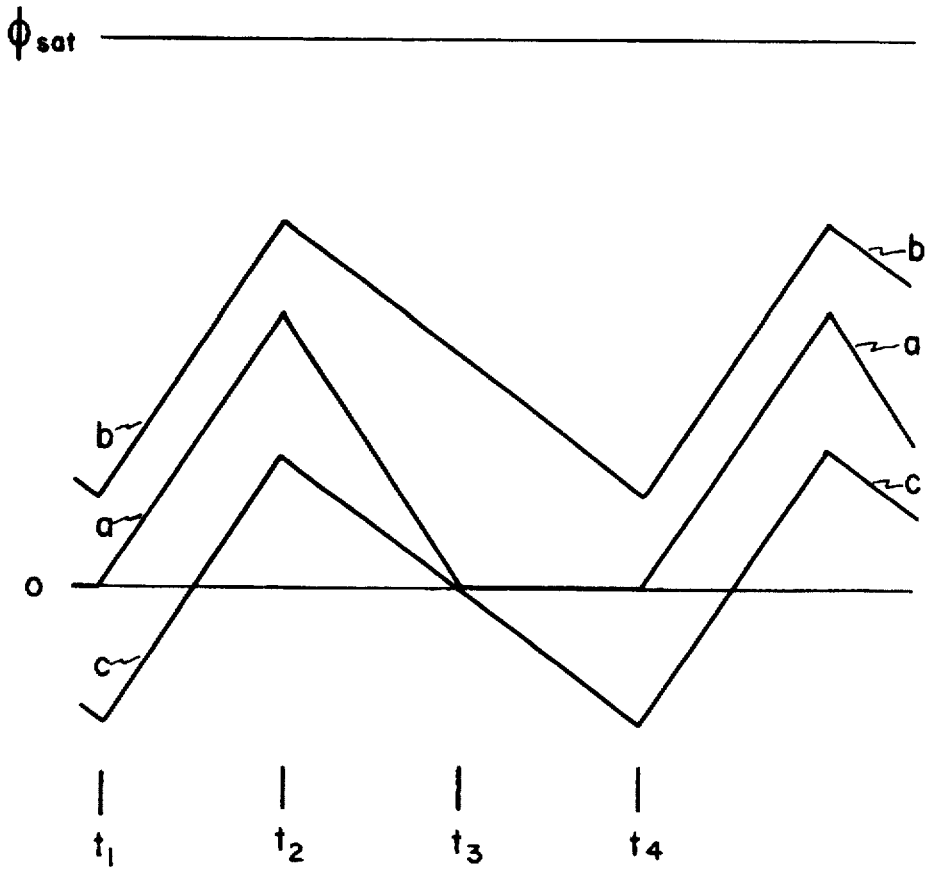
FIG. 5 compares idealized waveforms exemplifying the time evolution of the magnetic flux across the transformer's core in a single ended forward converter reset by: (a) the traditional mechanism, employing an auxiliary transformer winding; (b) the capacitor-resistor-diode network; (c) the optimal reset mechanism, utilizing a magnetizing current mirror.

Among the three reset mechanisms considered in FIG. 5, the capacitor-resistor-diode network (b) is the one that brings the core closest to saturation and does not recycle the core's magnetization energy. This qualifies this reset mechanism as the most inefficient in utilizing space (the volume of the core) and energy. Its redeeming feature is the constancy in the slope of the flux curve between $t_2$ and $t_4$ which, in view of Faraday's law, implies minimal voltage stress on the converter's primary switch.

Some of the drawbacks of the traditional reset mechanism (a) stem from the greater slope of the flux curve between $t_2$ and $t_3$ and vanishing slope between $t_3$ and $t_4$. These observations imply greater voltage stress on the primary switch, the presence of dead time, and a (50%) limitation on the duty cycle. Other drawbacks stem from the asymmetry between positive and negative flux, which signifies inefficient use of the core's volume and increased core energy losses.

In light of these considerations, the nature of curve c, characterizing the new reset mechanism, speaks for itself and suggests that a magnetizing current mirror should provide optimal resetting of the transformer's core in single ended forward converters.

Other embodiments are within the following claims.

I claim:

1. In a single ended forward converter in which energy is transferred from a primary winding to a secondary winding of a transformer during the ON period of a primary switch, circuitry for recycling the magnetizing energy stored in said transformer to reset it during the OFF period of said primary switch, comprising:

a storage capacitor;

an auxiliary switch connected in series with said storage capacitor;

a switch control circuit operating said auxiliary switch in accordance with a control logic such that (a) said auxiliary switch is opened prior the ON period of said primary switch, (b) said auxiliary switch remains open throughout the ON period of said primary switch, (c) said auxiliary switch is closed after the ON period of said primary switch.

2. The transformer resetting apparatus of claim 1 wherein said circuitry is connected in parallel with said secondary winding.

3. The transformer resetting apparatus of claim 1 wherein said circuitry is connected in parallel with said primary winding.

4. The transformer resetting apparatus of claim 1 wherein said transformer further includes an auxiliary winding, wherein said circuitry is connected in parallel with said auxiliary winding.

5. The transformer resetting apparatus of claim 1 wherein said auxiliary switch is a MOSFET transistor with an integral reverse diode.

6. In a single ended forward converter in which energy is transferred across a transformer during the ON period of a primary switch, an apparatus for recycling the magnetizing energy of said transformer during the OFF period of said primary switch, comprising:

a storage capacitor;

auxiliary switching means to selectively couple said storage capacitor to said transformer, wherein said storage capacitor and said transformer form a resonant circuit during the OFF period of said primary switch.

*7. The circuitry of claim 1 wherein said auxiliary switch is always closed to currents in one direction and selectively closed to currents in another direction.*

*8. The circuitry of claim 1 wherein said auxiliary switch is adapted to selectively couple said storage capacitor and said transformer to form a resonant circuit during the OFF period of said primary switch.*

*9. The circuitry of claim 1 wherein said circuitry is connected to a winding in the transformer.*

*10. The circuitry of claim 9 wherein said winding is a primary winding.*

*11. The circuitry of claim 9 wherein said winding is a secondary winding.*

*12. The circuitry of claim 9 wherein said winding is an auxiliary winding.*

*13. The circuitry of claim 9, 10, 11 or 12 wherein said auxiliary switch is adapted to selectively couple said storage capacitor and said transformer to form a resonant circuit during the OFF period of said primary switch.*

*14. The circuitry of claim 1 wherein an equivalent circuit of said converter, during the OFF period of said primary switch, comprises a resonant circuit formed by said capacitor and a winding of said transformer.*

*15. The circuitry of claim 14 wherein said winding comprises a primary winding.*

*16. The circuitry of claim 14 wherein said winding comprises a secondary winding.*

*17. The circuitry of claim 14 wherein said winding comprises a auxiliary winding.*

*18. The circuitry of claim 2 wherein said auxiliary switch is adapted to selectively couple said storage capacitor and said transformer to form a resonant circuit during the OFF period of said primary switch.*

*19. The circuitry of claim 3 wherein said auxiliary switch is adapted to selectively couple said storage capacitor and said transformer to form a resonant circuit during the OFF period of said primary switch.*

*20. The circuitry of claim 4 wherein said auxiliary switch is adapted to selectively couple said storage capacitor and said transformer to form a resonant circuit during the OFF period of said primary switch.*

*21. The circuitry of claim 1, 7, 8, 9, 10, 11, 12, 18, 19 or 20 wherein said auxiliary switch comprises a MOSFET transistor with an integral reverse diode.*

*22. The circuitry of claim 1, 7, 8, 9, 10, 11, 12, 18, 19 or 20 wherein the ON period of said primary switch begins a small delay period after opening said auxiliary switch.*

*23. The circuitry of claim 22 wherein said small delay period accommodates charging and discharging of capacitances in said converter.*

*24. The circuitry of claim 23 wherein said capacitances comprise parasitic capacitances.*

*25. The circuitry of claim 23 wherein said capacitances are associated with said auxiliary switch.*

*26. The circuitry of claim 23 wherein said capacitances are associated with said primary switch.*

*27. The circuitry of claim 23 wherein said capacitances are associated with said primary winding.*

*28. The circuitry of claim 23 wherein said parasitic capacitances are associated with said secondary winding.*

*29. In a single ended forward converter in which energy is transferred across a transformer during the ON period of a primary switch, an apparatus for recycling the magnetizing energy of said transformer during the OFF period of said primary switch, comprising:*

*a storage capacitor;*

*auxiliary switching means to selectively couple said storage capacitor to said transformer, wherein said storage capacitor and said transformer form a resonant circuit during the OFF period of said primary switch; and*

*wherein the ON period of said primary switch begins a small delay period after opening said auxiliary switching means.*

*30. The apparatus of claim 29 wherein said auxiliary switching means is always closed to currents in one direction and selectively closed to currents in another direction.*

*31. The apparatus of claim 29 wherein said storage capacitor is connected to a winding of the transformer.*

*32. The apparatus of claim 29 wherein said auxiliary switching means is connected to a winding of the transformer.*

*33. The apparatus of claim 29 wherein said storage capacitor and said auxiliary switching means are connected in parallel to a winding of the transformer.*

*34. The apparatus of claim 31 wherein said winding comprises a primary winding.*

*35. The apparatus of claim 32 wherein said winding comprises a primary winding.*

*36. The apparatus of claim 31 wherein said winding comprises a secondary winding.*

*37. The apparatus of claim 32 wherein said winding comprises a secondary winding.*

*38. The apparatus of claim 31 wherein said winding comprises an auxiliary winding.*

*39. The apparatus of claim 32 wherein said winding comprises an auxiliary winding.*

*40. The apparatus of claim 29, 30, 31, 32, 33, 34, 35, 36, 37, 38, or 39 wherein said small delay period accommodates charging and discharging of capacitances in said converter.*

*41. The apparatus of claim 40 wherein said capacitances comprise parasitic capacitances.*

*42. The apparatus of claim 41 wherein said capacitances are associated with said primary switch.*

*43. The apparatus of claim 41 wherein said capacitances are associated with said auxiliary switching means.*

*44. The apparatus of claim 41 wherein said capacitances are associated with windings in the transformer.*

* * * * *